US012629996B2

(12) United States Patent
Kovie

(10) Patent No.: US 12,629,996 B2
(45) Date of Patent: May 19, 2026

(54) VEHICLE DOOR ASSEMBLY

(71) Applicant: NISSAN NORTH AMERICA, INC., Franklin, TN (US)

(72) Inventor: David Kovie, Livonia, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 446 days.

(21) Appl. No.: 18/185,850

(22) Filed: Mar. 17, 2023

(65) Prior Publication Data

US 2024/0308307 A1     Sep. 19, 2024

(51) Int. Cl.
B60J 5/06     (2006.01)
B60J 5/04     (2006.01)
E05D 15/26    (2006.01)

(52) U.S. Cl.
CPC .............. B60J 5/06 (2013.01); B60J 5/0477 (2013.01); E05D 15/264 (2013.01)

(58) Field of Classification Search
CPC ........ B60J 5/047; B60J 5/0477; E05D 15/264
USPC ........................... 296/146.12, 146.11, 190.11
See application file for complete search history.

(56) References Cited

U.S. PATENT DOCUMENTS

| | | | | |
|---|---|---|---|---|
| 2,748,856 A | * | 6/1956 | Tatter | B60J 5/06 |
| | | | | 292/52 |
| 2,778,274 A | | 1/1957 | Behling | |
| 4,133,574 A | * | 1/1979 | Martin | B66F 9/07545 |
| | | | | 392/407 |
| 4,392,669 A | * | 7/1983 | Martin, Jr. | B60K 1/04 |
| | | | | 280/775 |
| 7,097,229 B1 | * | 8/2006 | Chernoff | B60J 5/06 |
| | | | | 296/146.12 |

FOREIGN PATENT DOCUMENTS

| | | | |
|---|---|---|---|
| CA | 2078836 A1 | | 3/1994 |
| CN | 201405708 Y | | 2/2010 |
| CN | 202573741 U | | 12/2012 |
| CN | 105221012 A | | 1/2016 |
| CN | 211032781 | * | 7/2020 |
| CN | 214929316 U | | 11/2021 |
| DE | 202010003634 | * | 9/2011 |

* cited by examiner

*Primary Examiner* — Joseph D. Pape

(74) *Attorney, Agent, or Firm* — Spencer Fane, LLP

(57)     ABSTRACT

A door assembly for a vehicle includes a rear door panel and a forward door panel. The rear door panel is configured to be hingedly connected to a vehicle body structure. The forward door panel is hingedly connected to the rear door panel. The forward door panel is configured to be lockingly connected to the vehicle body structure.

14 Claims, 8 Drawing Sheets

VEHICLE DOOR ASSEMBLY

BACKGROUND

Technical Field

The present disclosure generally relates to a vehicle door assembly. More specifically, the present disclosure relates to a vehicle door assembly in which a forward door panel is hingedly connected to a rear door panel.

Background Information

A vehicle door pivots about a vertical axis between a closed position and an open position. A width of a vehicle is increased when the door is pivoted to the open position.

SUMMARY

An object of the present disclosure is to provide a vehicle door assembly in which a forward door panel is hingedly connected to a rear door panel.

In view of the state of the known technology, one aspect of the present disclosure is to provide a door assembly for a vehicle including a rear door panel and a forward door panel. The rear door panel is configured to be hingedly connected to a vehicle body structure. The forward door panel is hingedly connected to the rear door panel. The forward door panel is configured to be lockingly connected to the vehicle body structure.

Another aspect of the present disclosure is to provide a vehicle door assembly for a vehicle. The vehicle door assembly includes a vehicle body structure and a door assembly. The vehicle body structure defines a door opening. The door assembly is connected to the vehicle body structure and is movable between a closed position in which the door opening is concealed by the door assembly and an open position in which the door opening is accessible. The door assembly includes a rear door panel and a forward door panel. The rear door panel is hingedly connected to the vehicle body structure at a rear end of the door opening. The forward door panel is hingedly connected to the rear door panel. The forward door panel is lockingly connected to the vehicle body structure at a forward end of the door opening.

Also other objects, features, aspects and advantages of the disclosed vehicle door assembly will become apparent to those skilled in the art from the following detailed description, which, taken in conjunction with the annexed drawings, discloses exemplary embodiments of the vehicle door assembly.

BRIEF DESCRIPTION OF THE DRAWINGS

Referring now to the attached drawings which form a part of this original disclosure.

DETAILED DESCRIPTION OF EMBODIMENTS

Figure 1:
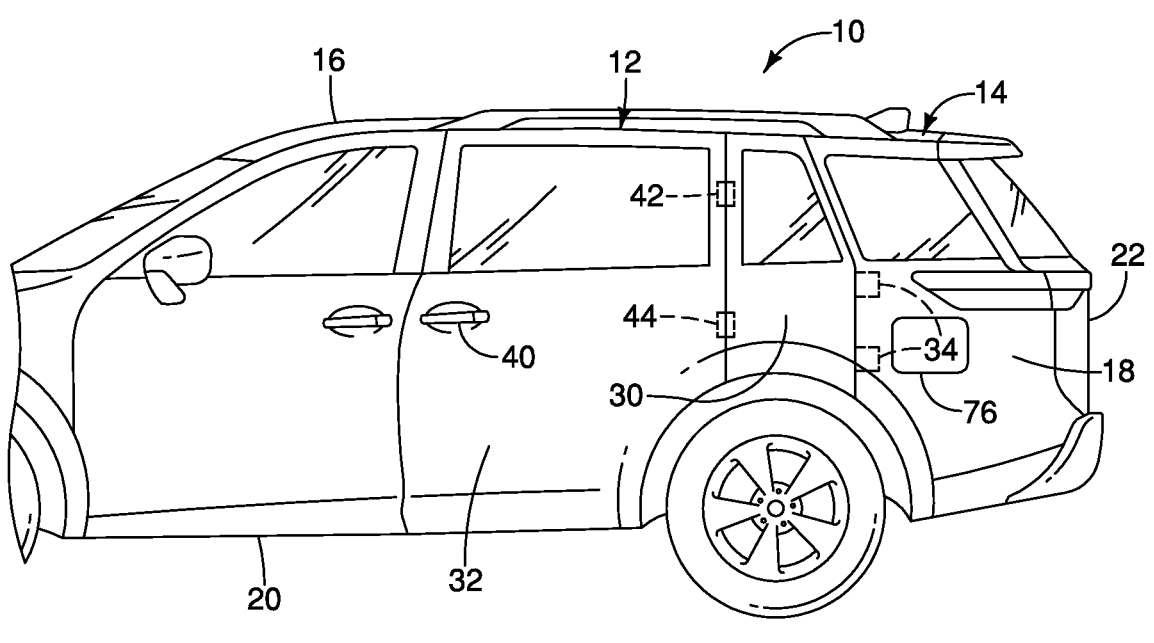
FIG. 1 is a side elevational view of a vehicle in which a vehicle door assembly is in a closed position.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-8, a vehicle 10 including a door assembly 12 is illustrated in accordance with an exemplary embodiment. Although illustrated as being a rear door on a driver side of the vehicle 10, the door assembly can be the rear door on the passenger side of the vehicle. In other words, the door assembly 12 can be the rear door on only the driver side of the vehicle 10, on only the passenger side of the vehicle, or on both the driver side and the passenger side of the vehicle.

The vehicle 10 has a vehicle body structure 14 that includes at least a roof panel 16, side panels 18, a floor panel 20, and a rear wall portion 22 defining a cargo/passenger compartment 24. The vehicle body structure 14 defines a door opening 26 that provides access to the cargo/passenger compartment 24. The door opening 26 is defined by the roof panel 16, the side panel 18 and the floor panel 20. The door assembly 12 is connected to the vehicle body structure 14 and is movable between a closed position in which the door opening 26 is concealed by the door assembly 12 and an open position in which the door opening 26 is accessible.

The vehicle body structure 14 also includes various additional conventional structures, components and elements that are well known in the art, such as a pillar 28. Since these structures, components and elements are well known in the art, further description is omitted for the sake of brevity.

The vehicle door assembly 12 includes a rear door panel 30 and a forward door panel 32. The vehicle door assembly 12 is movably connected to the vehicle body structure 14. The vehicle door assembly is movable between a closed position covering the door opening 26, as shown in FIGS. 1 and 2, and an open position exposing the door opening 26, as shown in FIGS. 3-8.

Figure 2:
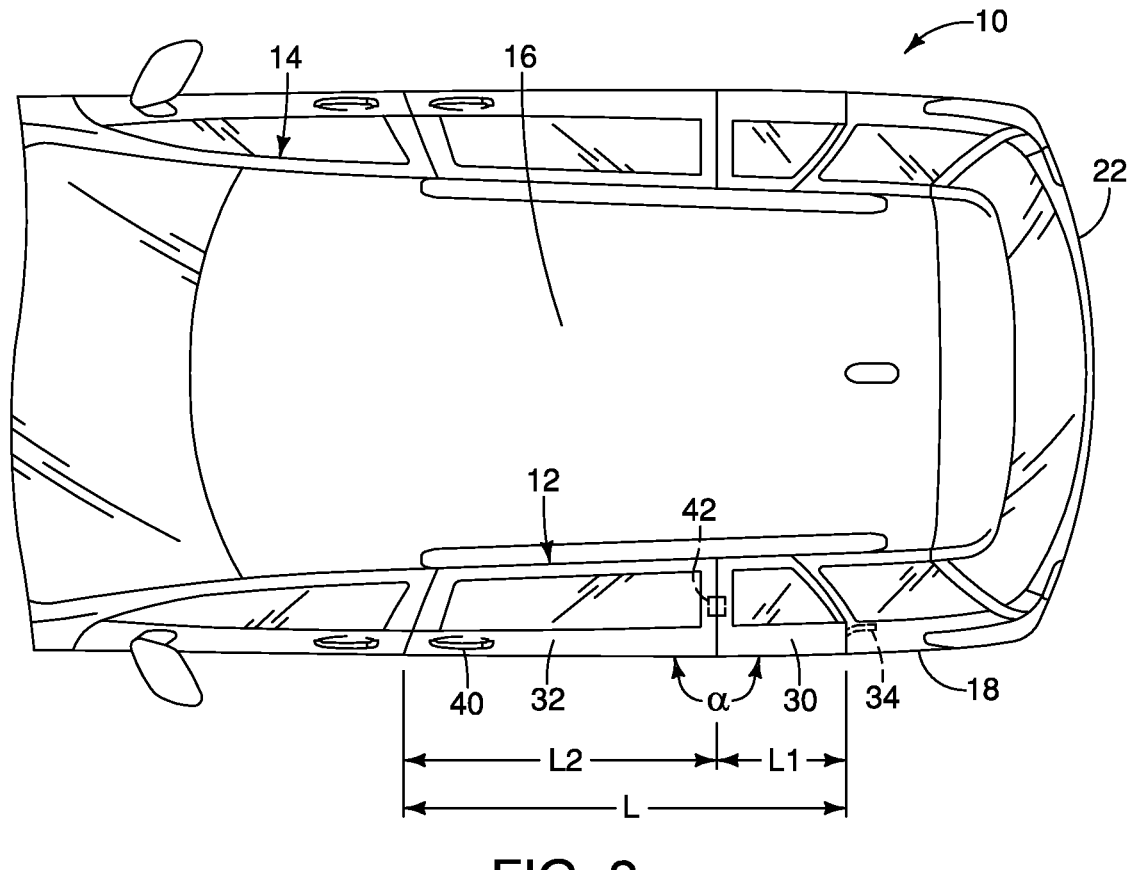
FIG. 2 is a top plan view of the vehicle of FIG. 1 in which the vehicle door assembly is in the closed position.
Figure 9:
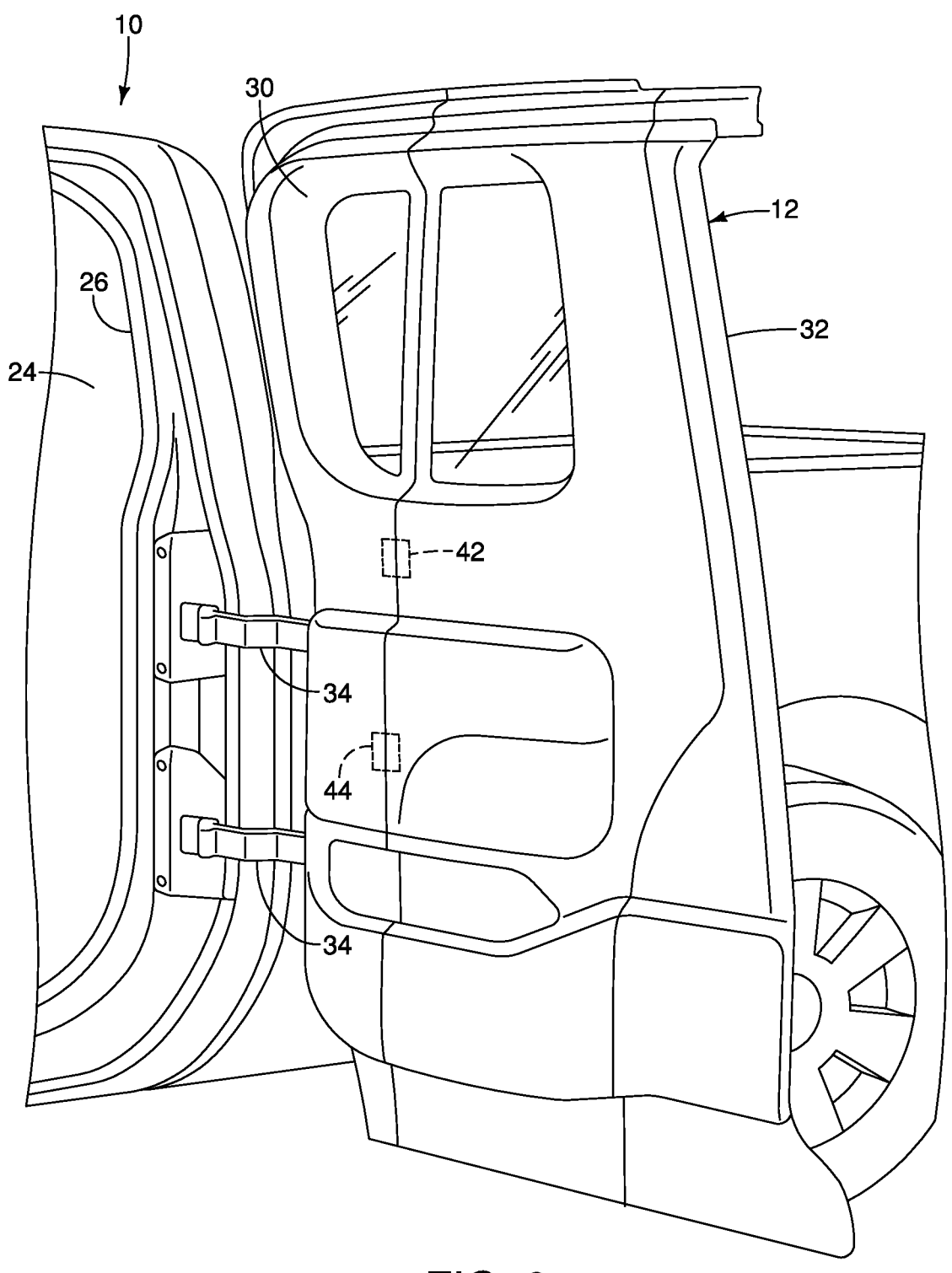
FIG. 9 is a perspective view of a hinge member connecting the rear door panel of the vehicle door assembly to a vehicle body structure of the vehicle.
Figure 11:
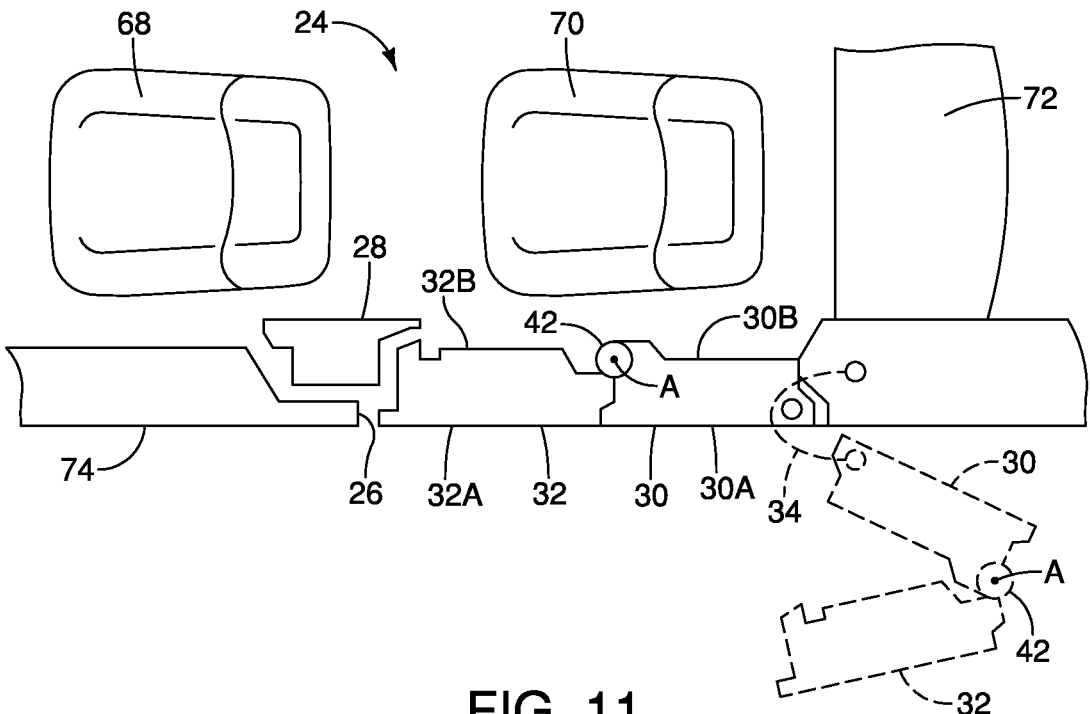
FIG. 11 is a top plan view in cross-section of the vehicle door assembly in the fully open position of FIG. 8.
Figure 12:
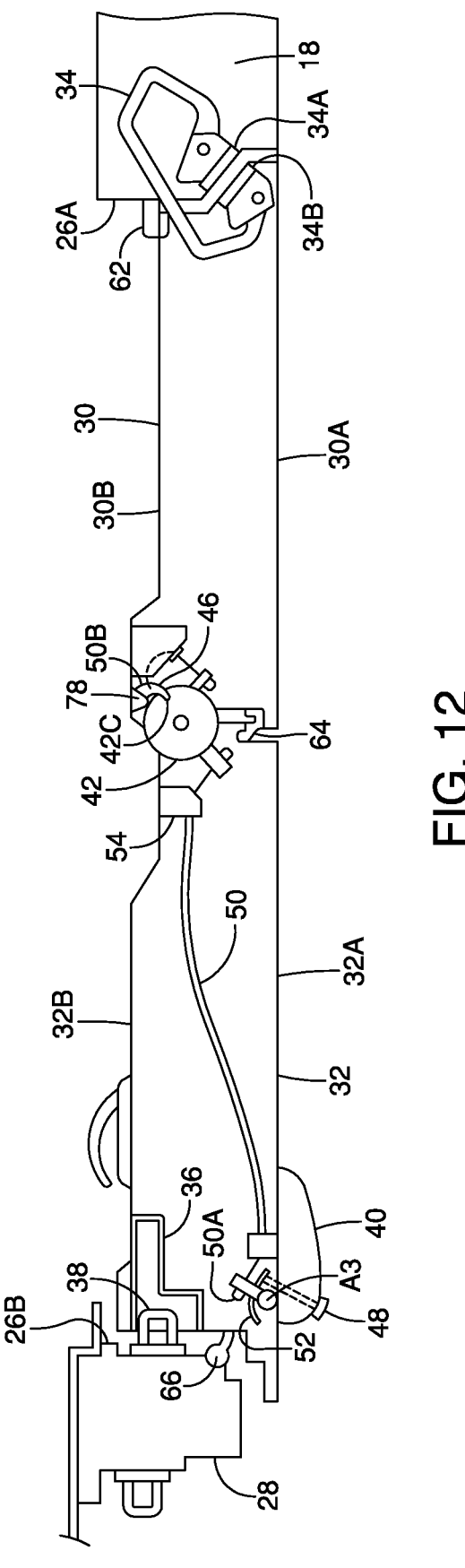
FIG. 12 is a top plan view in cross-section of the vehicle door assembly including a locking member between the front door panel and the rear door panel.

The rear door panel 30 is hingedly connected to the vehicle body structure 14, as shown in FIGS. 1, 9 and 12, at a rear end 26A of the door opening 26. The rear door panel 30 has an outer surface 30A and an inner surface 30B. The outer surface 30A faces the exterior of the vehicle 10. The inner surface 30B faces the passenger compartment 24. A first hinge member 34, as shown in FIGS. 9, 11 and 12, hingedly connects the rear door panel 30 to the vehicle body structure 14. The rear door panel 30 is configured to move approximately 180 degrees from the closed position (indicated by solid lines) to the fully open position (indicated by dashed lines), as shown in FIG. 11. The first hinge member 34 is any suitable hinge member allowing for approximately 180 degree movement of the rear door panel 30 relative to the vehicle body structure 14, such as a conventional goose-neck hinge member shown in FIGS. 9 and 12. A first end 34A of the first hinge member 34 is connected to the vehicle body structure 14. A second end 34B of the first hinge member 34 is connected to the rear door panel 30. As shown in FIG. 9, two of the first hinge members 34 hingedly connect the rear door panel 30 to the vehicle body structure 14, although any suitable number of first hinge members can be used.

Figure 13:
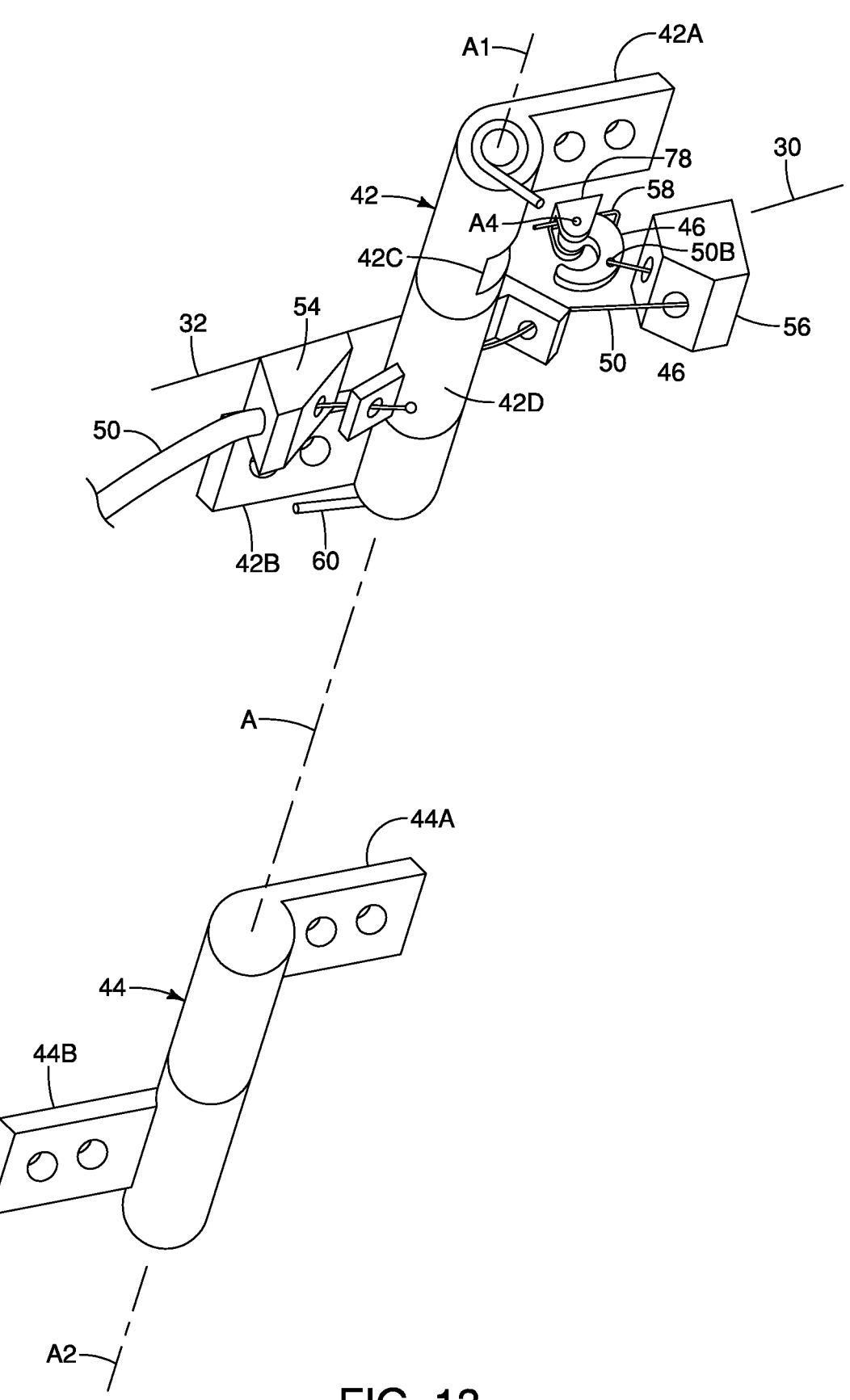
FIG. 13 is a perspective view of the locking member of FIG. 12.

The forward door panel 32 is hingedly connected to the rear door panel 30, as shown in FIGS. 11-13. The forward door panel 32 has an outer surface 32A and an inner surface 32B. The outer surface 32A faces the exterior of the vehicle 10. The inner surface 32B faces the passenger compartment 24. The forward door panel 32 is lockingly connected to the vehicle body structure 14 at a forward end 26B of the door opening 26. The forward door panel 32 is lockingly connected to the vehicle body structure 14 in any suitable manner. As shown in FIG. 12, the forward door panel 32 includes a conventional latch 36 configured to lockingly connect to a conventional striker 38 connected to the pillar 28 of the vehicle body structure 14.

A door handle 40 disposed on the outer surface 32A of the forward door panel 32 is configured to unlock the forward door panel 32 from the pillar 28 of the vehicle body structure 14 in a conventional manner. The door handle 40 can include a conventional sensor, such as a capacitive sensor, that allows operation of the door handle 40 to disengage the latch 36 from the striker 38 to move the door assembly 12 from the closed position to the open position.

Figure 10:
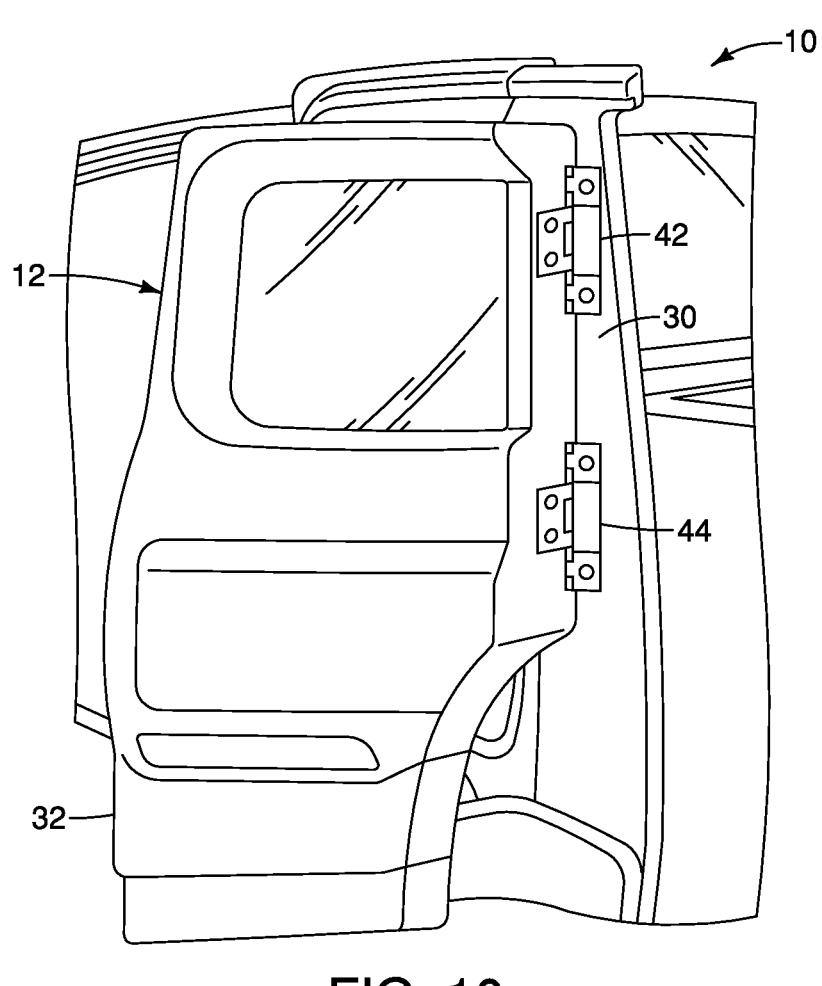
FIG. 10 is a perspective view of a hinge member connecting the rear door panel to the front door panel of the vehicle door assembly.

A second hinge member 42 hingedly connects the rear door panel 30 to the forward door panel 32, as shown in FIGS. 10 and 13. The second hinge member 42 includes a first hinge mount 42A connected to the rear door panel 30 and a second hinge mount 42B connected to the forward door panel 32. The second hinge member 42 allows movement between the forward door panel 32 and the rear door panel 30. The forward door panel 32 is configured to pivot about the first pivot axis A1 of the second hinge member 42. The forward door panel 32 is configured to pivot about the first pivot axis A1 approximately 180 degrees relative to the rear door panel 30, as shown in FIG. 11.

A third hinge member 44 hingedly connects the rear door panel 30 to the forward door panel 32. The third hinge 44 member is preferably disposed lower than the second hinge member 42, as shown in FIG. 13, although the third hinge member 44 can be disposed above the second hinge member 42. The third hinge member 44 includes a first hinge mount 44A connected to the rear door panel 30 and a second hinge mount 44B connected to the forward door panel 32. A second pivot axis A2 of the third hinge member 44 is aligned with the first pivot axis A1 of the second hinge member 42. In other words, the first and second hinge axes A1 and A2 are collinear to define the pivot axis A of the rear door assembly 12.

Figures 3, 4:
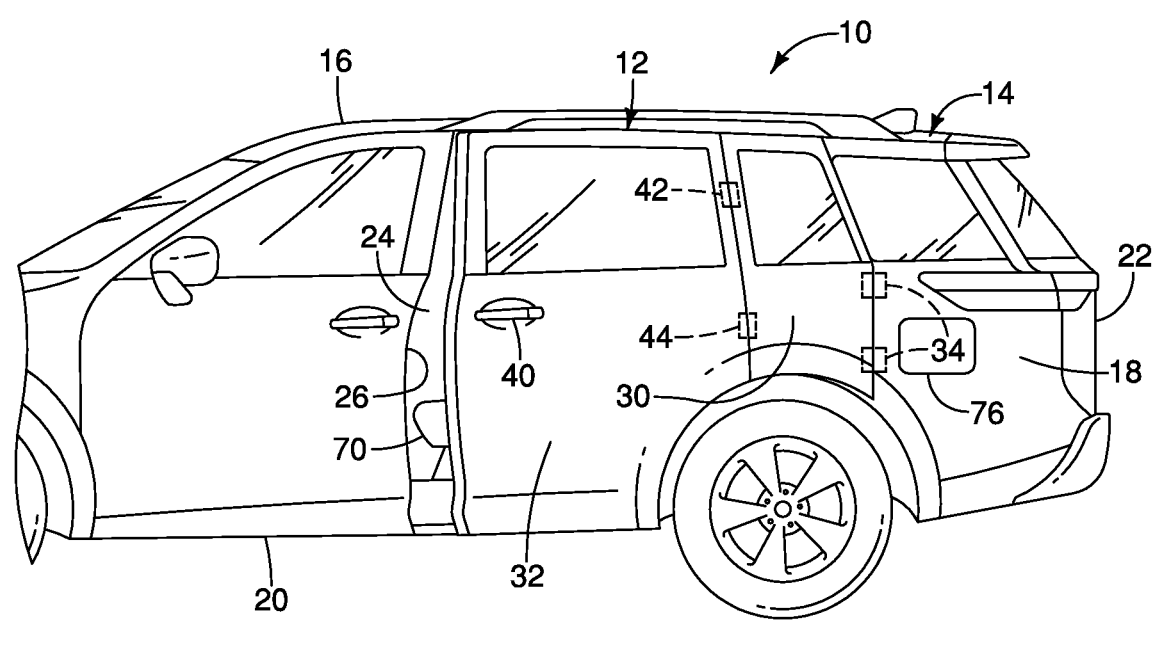
FIG. 3 is a side elevational view of the vehicle of FIG. 1 in which the vehicle door assembly is moved to an open position.
FIG. 4 is top plan view of the vehicle of FIG. 3 in which the vehicle door assembly is moved to the open position.

A locking member 46 is movably connected to the rear door panel 30, as shown in FIGS. 12 and 13. The locking member 46 is connected to the rear door panel 30 by a bracket member 78. The locking member 46 lockingly connects the forward door panel 32 to the rear door panel 30 to prevent movement of the forward door panel 32 relative to the rear door panel 30. As shown in FIGS. 3 and 4, the forward door panel 32 is locked to the rear door panel 30 such that the rear door panel 30 moves with the forward door panel 32 upon movement of the forward door panel 32. As shown in FIGS. 5-8, the forward door panel 32 is unlocked from the rear door panel 30 such that the forward door panel 32 is movable relative to the rear door panel 30.

The locking member 46 engages a notch 42C in a lower body 42D of the second hinge member 42, as shown in FIG. 12. The locking member 46 engages the notch 42C to lock the forward door panel 32 to the rear door panel 30. The forward door panel 32 is configured to move with the rear door panel 30 when the locking member 46 engages the notch 42C in the second hinge member 42, as shown in FIGS. 3 and 4. When the locking member 46 is in the locked position, the forward door panel 32 is substantially prevented from moving relative to the rear door panel 30. The locking member 46 engages the notch 42C in the second hinge member 42, thereby substantially preventing movement of the forward door panel 32 relative to the rear door panel 30. Releasing the locking member 46 from engagement with the second hinge member 42 unlocks the forward door panel 32 from the rear door panel 30 such that the forward door panel 32 is movable relative to the rear door panel 30, as shown in FIGS. 5-8. In other words, the forward door panel 32 is configured to move relative to the rear door panel 30 when the forward door panel 32 is unlocked from the rear door panel 30.

A lock release member 48 is configured to release the locking member 46 from the locked position, as shown in FIG. 12. The lock release member 48 is disposed proximate the door handle 40 on the forward door panel 32. The lock release member 48 is any suitable member, such as a push button, configured to actuate a release cable 50. A first end 50A of the release cable 50 is fixed to a bracket member 52. A second end 50B of the release cable 50 is fixed to the locking member 46. A first cable mount 54 can be disposed in the forward door panel 32 to facilitate guiding the cable 50 from the bracket member 52 to the second hinge member 42. The cable 50 preferably passes through the lower body 42D of the second hinge member to a second cable mount 56 disposed in the rear door panel 30. Openings can be diametrically opposed in the lower body 42D of the second hinge member 42 to pass the cable 50 therethrough. The second cable mount 56 guides the cable 50 to the locking member 46.

Actuating the lock release member 48, causes the cable 50 to be pulled to the left, or in a forward direction of the vehicle, as shown in FIG. 12. The lock release member 48 engages the bracket member 52 and rotates the bracket member in the counter-clockwise direction about a third pivot axis A3, thereby pulling the cable 50 in the forward direction. The forward movement of the cable 50 moves the locking member 46 in a counter-clockwise direction about a fourth pivot axis A4, as shown in FIG. 13, such that the locking member 46 disengages the notch 42C in the second hinge member 42. The forward door panel 32 is movable about the pivot axis A.

A first biasing member 58 is disposed on the fourth pivot axis A4 of the locking member 46 to bias the locking member to the locked position engaging the second hinge member 42, as shown in FIG. 13. In other words, the first biasing member 58 biases the locking member 46 to the locked position in which the forward door panel 32 is substantially prevented from moving relative to the rear door panel 30. The locking member 46 is rotatably connected to the bracket member 78 to move between a position engaging the first hinge member 42 (FIG. 12) and a position disengaged from the first hinge member 42 (FIG. 13). When the forward door panel 32 is returned to a closed position in which the forward door panel 32 is aligned with the rear door panel 30, as shown in FIGS. 1-4, the first biasing member 58 causes the locking member 46 to engage the notch 42C in the lower body member 42D and to lock the forward door panel 32 to the rear door panel 30. The forward door panel 32 is aligned with the rear door panel when an angle α between the forward door panel 32 and the rear door panel 30 is approximately 180 degrees. The first biasing member 58 can be any suitable biasing member, such as a torsion spring.

A second biasing member 60 is disposed on the first pivot axis A1 in the second hinge member 42, as shown in FIG. 13. The second biasing member 60 biases the forward door panel 32 to the locked position with the rear door panel 30. In other words, the second biasing member 60 biases the forward door panel 32 to a position in which the angle α between the forward door panel 32 and the rear door panel 30 is approximately 180 degrees. The second biasing member 60 can be any suitable biasing member, such as a torsion spring.

As shown in FIG. 12, a first seal member 62 is disposed between the rear door panel 30 and the vehicle body structure 14. A second seal member 64 is disposed between the rear door panel 30 and the forward door panel 32. A third seal member 66 is disposed between the forward door panel 32 and the vehicle body structure 14. The first, second and third seal members 62, 64 and 66 substantially prevent water from entering the vehicle cabin when the door assembly 12 is in the closed position, as shown in FIGS. 1, 2 and 12.

As shown in FIG. 11, the passenger compartment 24 includes a first row of seats 68, a second row of seats 70 and a third row of seats 72. The first row of seats 68 is accessible by opening a forward door assembly 74. The second and third rows of seats 70 and 72 are accessible by opening the rear door assembly 12.

As shown in FIGS. 1, 2 and 11, the rear door assembly 12 covers the door opening 26 when the door assembly 12 is in the closed position. The door assembly 12 is connected to the vehicle body structure 14. The door assembly 12 is movable between the closed position, as shown in FIGS. 1 and 2, in which the door opening 26 is concealed by the door assembly 12 and an open position, as shown in FIGS. 3-8, in which the door opening 26 is accessible.

The door handle 40 is operated in a conventional manner to unlock the forward door panel 32 from the vehicle body structure 14. The rear door panel 30 moves with the forward door panel upon movement of the forward door panel 32 when the forward door panel 32 is locked to the rear door panel 30 and the forward door panel is unlocked from the vehicle body structure 14, as shown in FIGS. 3 and 4. In other words, the angle α between the forward door panel 32 and the rear door panel 30 is approximately 180 degrees when the door assembly 12 is opened from the locked position shown in FIGS. 1 and 2.

Figure 5:
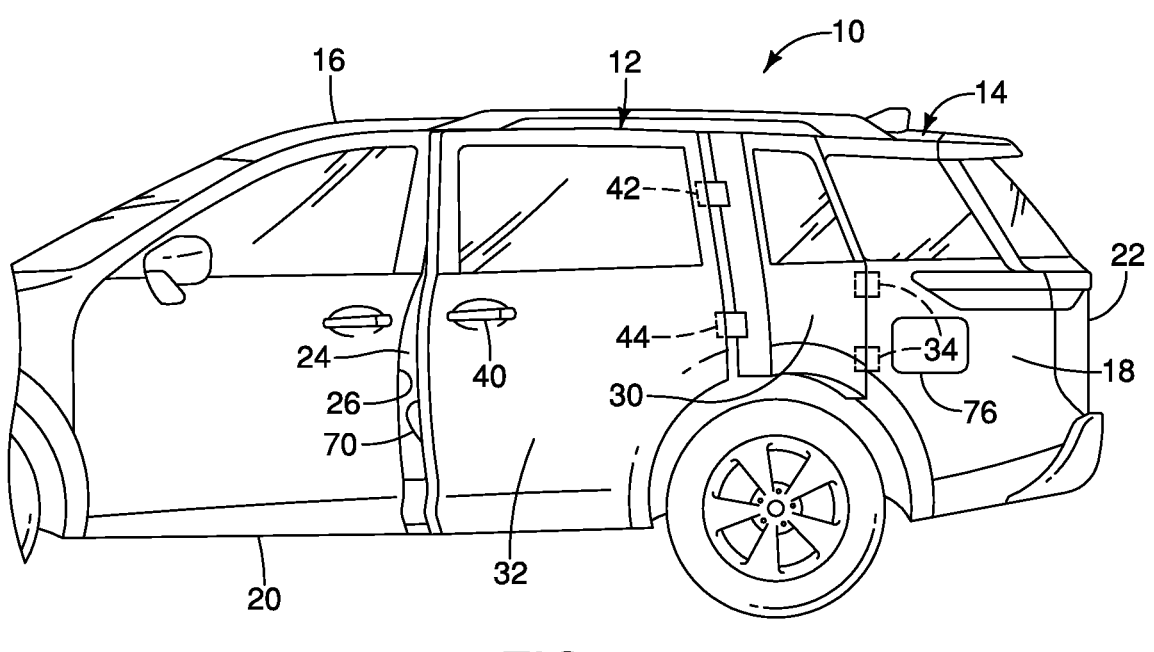
FIG. 5 is a side elevational view of the vehicle of FIG. 3 in which a front door panel is moved relative to a rear door panel.
Figure 6:
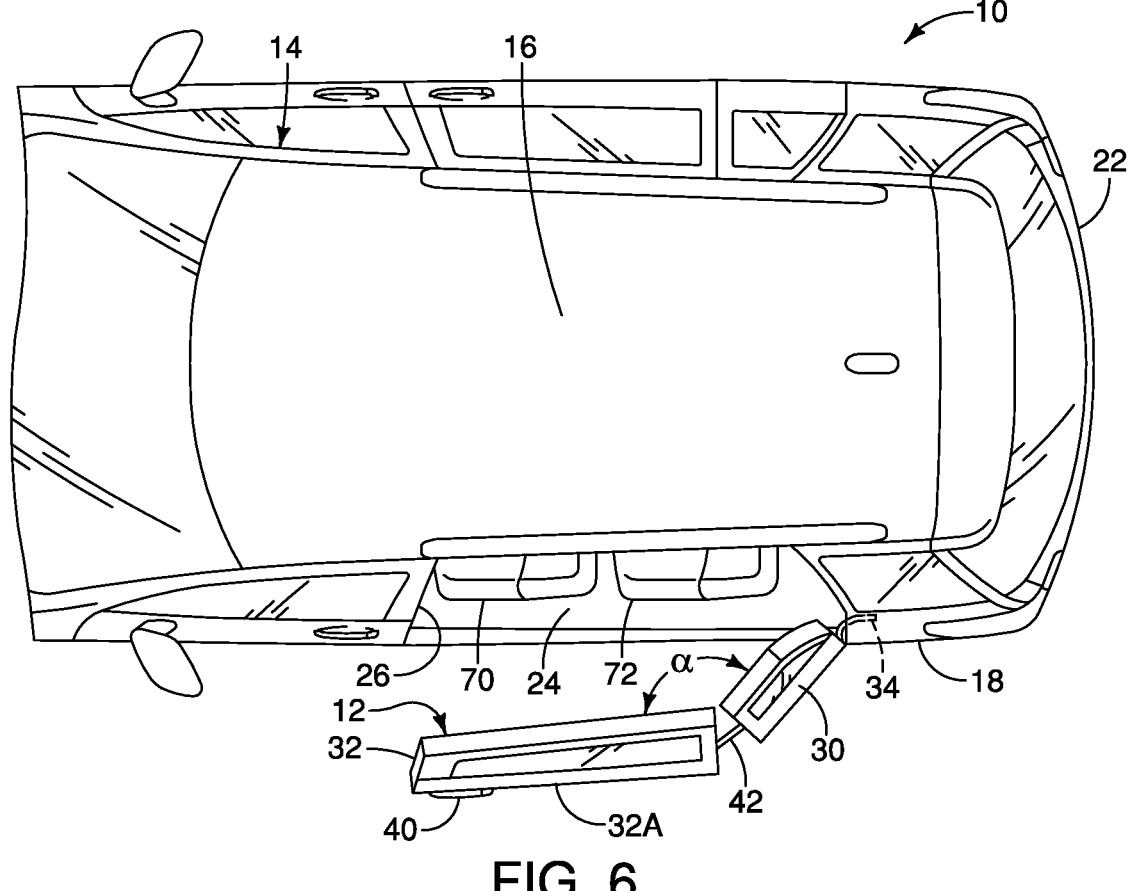
FIG. 6 is a top plan view of the vehicle of FIG. 5 in which the front door panel is moved relative to the rear door panel.

The forward door panel 32 moves relative to the rear door panel 30 when the forward door panel 32 is unlocked from the rear door panel 30 and the forward door panel 32 is unlocked from the vehicle body structure 14, as shown in FIGS. 5 and 6. Activating the lock release member 48, as shown in FIGS. 12 and 13, unlocks the forward door panel 32 from the rear door panel 30. The forward door panel 32 can then be rotated about the pivot axis A relative to the rear door panel 30. Rotation of the forward door panel 32 about the pivot axis A reduces the angle α between the forward door panel 32 and the rear door panel 30 to less than 180 degrees.

Figure 7:
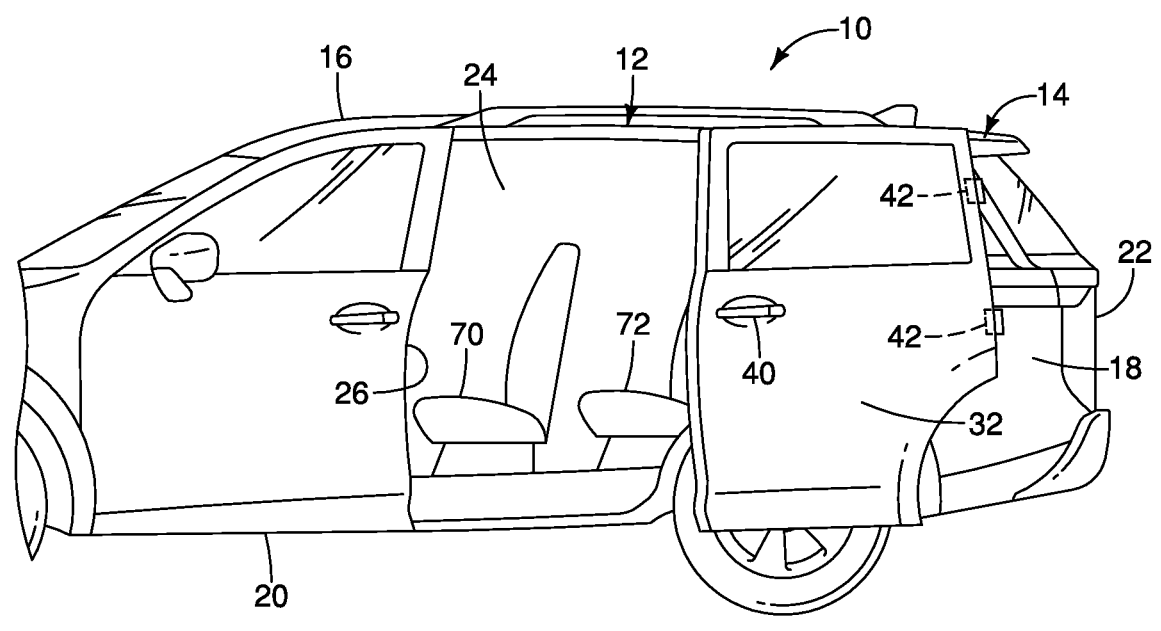
FIG. 7 is a side elevational view of the vehicle of FIG. 5 in which the vehicle door assembly is in a fully open position.
Figure 8:
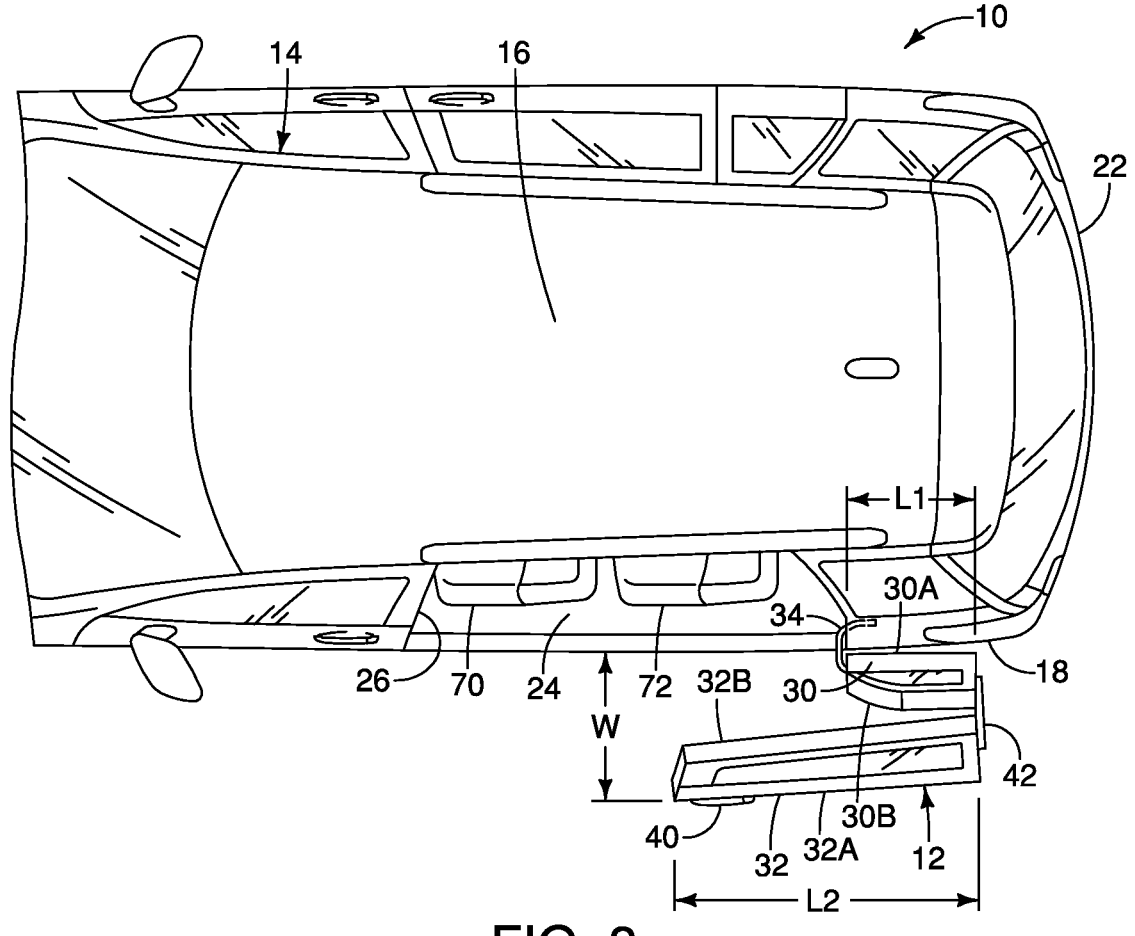
FIG. 8 is a top plan view of the vehicle of FIG. 7 in which the vehicle door assembly in in the fully open position.

The rear door panel 30 is configured to rotate approximately 180 degrees relative to the vehicle body structure 14, as shown in FIGS. 7, 8 and 11. The forward door panel 32 is configured to pivot approximately 180 degrees about the pivot axis A relative to the rear door panel 30, as shown in FIGS. 7 and 8, after unlocking the forward door panel 32 from the rear door panel 30. The rear door panel 30 is configured to rotate in a first direction, or counter-clockwise direction, when moving the door assembly 12 from the closed position to the open position, as shown in FIGS. 1-8. The rear door panel 30 moves in the counter-clockwise direction when moving from the closed position to the fully open position. The forward door panel 32 is configured to pivot in a second direction relative to the rear door panel 30 when unlocking the forward door panel 32 from the rear door panel 30, as shown in FIGS. 1-8. The forward door panel 32 pivots in the clockwise direction when moving relative to the rear door panel 30.

As shown in FIG. 7, the forward door panel 32 overlies the rear door panel 30 when viewed in a lateral direction of the vehicle 10 when the rear door panel 30 is rotated approximately 180 degrees relative to the vehicle body structure 14 and the forward door panel 32 is rotated approximately 180 degrees relative to the rear door panel 30. In other words, with both the rear door panel 30 and the forward door panel 32 in the fully open positions, as shown in FIGS. 7 and 8, the inner surface 32A of the forward door panel 32 faces the inner surface 30A of the rear door panel 30, the outer surface 30B of the rear door panel 30 faces the vehicle 10, and the outer surface 32B of the forward door panel 32 faces away from the vehicle 10. As shown in FIG. 8, a length L1 of the rear door panel 30 is less than a length L2 of the forward door panel 32. Alternatively, the length L1 of the rear door panel 30 can be substantially equal to a length L2 of the forward door panel 32. The door assembly 12 is illustrated being on the same side of the vehicle 10 as the fuel door 76. As shown in FIG. 1, the door assembly 12 is disposed forward of the fuel door 76. Alternatively, the door assembly 12 can be disposed on an opposite side of the vehicle 10 as the fuel door 76, or the door assembly 12 can be disposed on both sides of the vehicle 10.

The forward door panel 32 being pivotable relative to the rear door panel 30 reduces a width that the rear door assembly 12 extends from the vehicle when moving the door assembly 12 between closed and open positions. In a conventional vehicle, a door extends from the vehicle a distance equal to a length of the door when moving the door between open and closed positions. As shown in FIG. 8, a width W that the rear door assembly 12 extends from the vehicle 10 is less than a total length L1 of the rear door panel 30 and L2 of the forward door panel 32. In other words, unlocking the forward door panel 32 from the rear door panel 30 reduces the width W of the door assembly 12 in a lateral vehicle direction when the door assembly 12 moves between the closed position and the open position. The vehicle 10 requires less surrounding space in a lateral direction of the vehicle to move the door assembly 12 between opened and closed positions, such that the door assembly 12 can be opened and closed in tighter spaces to provide access to the second and third rows of seats 70 and 72 in the passenger compartment 24, as shown in FIGS. 7, 8 and 11. A side step (not illustrated) can be connected to the vehicle structure 14 on the same side of the vehicle 10 as the door assembly 12 to facilitate accessing the passenger compartment 24.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A door assembly for a vehicle comprising:
   a rear door panel configured to be hingedly connected to a vehicle body structure;
   a forward door panel hingedly connected to the rear door panel, the forward door panel being configured to be lockingly connected to the vehicle body structure;
   a locking member configured to lockingly connect the forward door panel to the rear door panel to substantially prevent movement of the forward door panel relative to the rear door panel, and

a lock release member configured to be activated to unlock the forward door panel from the rear door panel, the lock release member being connected proximate a door handle on the forward door panel,
   the rear door panel being configured to move with the forward door panel upon movement of the forward door panel when the forward door panel is locked to the rear door panel,
   the forward door panel being configured to be movable relative to the rear door panel when the forward door panel is unlocked from the rear door panel, and
   the forward door panel being configured to pivot about a pivot axis such that an inner surface of the forward door panel faces an inner surface of the rear door panel.

2. The door assembly according to claim 1, wherein the forward door panel is configured to pivot approximately 180 degrees relative to the rear door panel.

3. The door assembly according to claim 1, wherein the forward door panel is longer than the rear door panel.

4. A vehicle door assembly comprising:
   a vehicle body structure defining a door opening;
   a door assembly connected to the vehicle body structure and movable between a closed position in which the door opening is concealed by the door assembly and an open position in which the door opening is accessible, the door assembly including
      a rear door panel hingedly connected to the vehicle body structure at a rear end of the door opening; and
      a forward door panel hingedly connected to the rear door panel, the forward door panel being lockingly connected to the vehicle body structure at a forward end of the door opening;
   a locking member configured to lock the forward door panel to the rear door panel to substantially prevent movement of the forward door panel relative to the rear door panel; and
   a biasing member configured to bias the locking member to a locked position in which the forward door panel is substantially prevented from moving relative to the rear door panel.

5. The vehicle door assembly according to claim 4, wherein the rear door panel moves with the forward door panel upon movement of the forward door panel when the forward door panel is locked to the rear door panel and the forward door panel is unlocked from the vehicle body structure.

6. The vehicle door assembly according to claim 4, wherein the forward door panel moves relative to the rear door panel when the forward door panel is unlocked from the rear door panel and the forward door panel is unlocked from the vehicle body structure.

7. The vehicle door assembly according to claim 4, wherein a lock release member is connected proximate a door handle on the forward door panel, activating the lock release member unlocks the forward door panel from the rear door panel.

8. The vehicle door assembly according to claim 4, wherein the forward door panel is configured to pivot approximately 180 degrees relative to the rear door panel.

9. The vehicle door assembly according to claim 4, wherein the rear door panel is configured to rotate approximately 180 degrees relative to the vehicle body structure.

10. The vehicle door assembly according to claim 4, wherein unlocking the forward door panel from the rear door panel reduces a width of the door assembly in a lateral vehicle direction when the door assembly moves between the closed position and the open position.

11. The vehicle door assembly according to claim 4, wherein the rear door panel is configured to rotate in a first direction when moving the door assembly from the closed position to the open position, and the forward door panel is configured to rotate in a second direction relative to the rear door panel when unlocking the forward door panel from the rear door panel.

12. The vehicle door assembly according to claim 4, wherein the forward door panel is longer than the rear door panel.

13. The vehicle door assembly according to claim 4, wherein the forward door panel overlies the rear door panel when viewed in a lateral vehicle direction when the rear door panel is rotated approximately 180 degrees relative to the vehicle body structure and the forward door panel is pivoted approximately 180 degrees relative to the rear door panel.

14. A door assembly for a vehicle comprising:

a rear door panel configured to be hingedly connected to a vehicle body structure;

a forward door panel hingedly connected to the rear door panel, the forward door panel being configured to be lockingly connected to the vehicle body structure; and a locking member configured to lockingly connect the forward door panel to the rear door panel to substantially prevent movement of the forward door panel relative to the rear door panel;

the rear door panel being configured to move with the forward door panel upon movement of the forward door panel when the forward door panel is locked to the rear door panel, the forward door panel being configured to be movable relative to the rear door panel when the forward door panel is unlocked from the rear door panel, and the forward door panel being configured to pivot about a pivot axis such that an inner surface of the forward door panel faces an inner surface of the rear door panel, the forward door panel being configured to pivot approximately 180 degrees relative to the rear door panel.

\* \* \* \* \*